United States Patent Office 2,727,032
Patented Dec. 13, 1955

2,727,032

COBALTIFEROUS MONOAZO-DYESTUFFS

Arthur Buehler, Rheinfelden, and Christian Zickendraht, Binningen, Switzerland, assignors to Ciba Limited, Basel, Switzerland, a Swiss firm No Drawing. Application August 4, 1952,
Serial No. 302,626

Claims priority, application Switzerland August 7, 1951

17 Claims. (Cl. 260—147)

According to this invention valuable new cobaltiferous azo-dyestuffs are made by treating a monoazo-dyestuff free from sulfonic acid and carboxylic acid groups and corresponding to the general formula (1) 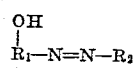
$$R_1-N=N-R_2$$

in which $R_1$ represents a benzene radical bound to the azo linkage in ortho-position relatively to the hydroxyl group, and $R_2$ represents the radical of a coupling component containing an aromatic radical and capable of coupling in a position vicinal to a hydroxyl group, and in which one of the radicals $R_1$ and $R_2$ contains an aromatically bound methyl sulfone group with an agent yielding cobalt in such manner that the resulting cobaltiferous dyestuff contains less than one atom of cobalt in complex union per molecule of monoazo-dyestuff.

The monoazo-dystuffs corresponding to the above general formula and serving as starting materials in the present process can be made from diazo- and coupling-components which are free from sulfonic acid and carboxylic acid groups and contain an aromatically bound methyl-sulfone group, which may be present in the coupling-component or in the diazo-component, but advantageously in the latter component. Such dyestuff components containing an aromatically bound methyl sulfone group are obtained by methods in themselves known by methylating the appropriate sulfinic acids, for example, with dimethylsulfate, or by oxidizing the appropriate aromatic methyl thioethers. Thus, the methyl-sulfonyl-orthoaminophenols valuable in the present process are obtainable from ortho-nitro-chlorobenzene sulfonic acid chlorides by first converting the latter by mild reduction with sodium sulfite into the corresponding sulfinic acids, methylating the latter, then replacing the chlorine atom by a hydroxyl group by means of caustic alkali, and converting the nitro group into an amino group, for example, by reduction with sodium sulfide.

As examples of diazo compounds coming into consideration there may be mentioned those obtained by diazotizing the following amines:

(a) Amines containing methyl sulfone groups such as 6-nitro- or 6-chloro-2-amino-1-hydroxybenzene-4-methyl sulfone, 4-nitro- or 4-chloro-2-amino-1-hydroxybenzene-5- or -6-methyl sulfone, 2-amino-1-hydroxybenzene-4:6-di-(methyl sulfone) and especially 2-amino-1-hydroxybenzene-4- or -5-methyl sulfone, and also (b) Compounds containing no methyl sulfone groups, (which are therefore coupled only with azo components containing methyl sulfone groups), such as 4-nitro-, 4-chloro-, 4-methoxy- or 4-methyl-2-amino-1-hydroxybenzene, 4:6-dichloro-2-amino-1-hydroxybenzene, 5-nitro-2-amino-1-hydroxybenzene, 4-nitro-6-chloro-2-amino-1-hydroxybenzene, 3:4:6-trichloro-2-amino-1-hydroxybenzene, 3-amino-4-hydroxy-acetophenone, 4-nitro-6-acetyl-amino-2-amino-1-hydroxybenzene, 6-nitro-4-acetylamino-2-amino-1-hydroxybenzene, 4-chloro-2-amino-1-hydroxybenzene-5- or -6-sulfonic acid amide, 6-nitro-2-amino-1-hydroxybenzene-4-sulfonic acid amide, 2-amino-1-hydroxybenzene-4- or -5-sulfonic acid amide and the corresponding substituted sulfonic acid amides such as 2-amino-1-hydroxybenzene-4-sulfonic acid methylamide, ethylamide, n-butylamide, dimethylamide, diethylamide or phenylamide.

As coupling components to be used for preparing the monoazo-dyestuffs serving as starting materials in the present process, there come into consideration those which contain an aromatic radical and owe their coupling capacity to a phenolic hydroxy group or a keto methylene group. Coupling compounds which are free from methylsulfone groups or which contain up to 2 methylsulfone groups may be used. Among the coupling components free from methyl sulfone groups, which are to be coupled only with the diazo compounds of the hydroxy-amines mentioned above under (a), there may be mentioned, for example, hydroxyquinolines; phenols such as para-cresol or resorcinol; naphthols such as 4-methyl-1-hydroxynaphthalene, 5-chloro- or 5:8-dichloro-1-hydroxynaphthalene, 2-hydroxy-naphthalene, 6-methoxy- or 6-bromo-2-hydroxynaphthalene, 1-acetyl-, 1-n-butyryl- or 1-benzoylamino -7- hydroxynaphthalene, 2-hydroxynaphthalene-6-sulfonic acid amide or the corresponding N-methylamide or N-phenylamide; acylacetic acid arylamides, such as acetoacetic acid phenylamide, aceto acetic acid orthochloranilide, 1-acetoacetylaminobenzene-3- or -4-sulfonic acid amide; pyrazolones such as 5-pyrazolone-3-carboxylic acid anilide, 1-phenyl - 3 - methyl - 5 - pyrazolone, 1-phenyl-3-methyl-5-pyrazolone-3'- or 4'-sulfonic acid amide, 1-phenyl-3-methyl-5-pyrazolone-4'-sulfonic acid-N-methylamide, or -N-phenylamide, 1-phenyl-5-pyrazolone-3-carboxylic acid amide, 1-phenyl-5-pyrazolone-3-carboxylic acid-N-butylamide or -N-phenylamide, and also 1-(2'- or 3'- or 4'-chlorophenyl)-3-methyl-5-pyrazolone. Coupling components containing methyl sulfone groups, which can be coupled either with the diazo compounds obtained from the hydroxy amines mentioned under (a) above or those mentioned under (b) above, are obtainable, for example, from aminobenzene methyl sulfones by condensing the latter with diketene or β-keto-carboxylic acid esters to form the corresponding aceto or acylacetic acid anilides, or by converting the amino group of the aminobenzene methyl sulfones by methods in themselves known into a hydrazine group, and condensing the resulting products with β-keto-carboxylic acid esters to form 1-aryl-5-pyrazolones. It is also possible to convert O-acyl-sulfonyl compounds of naphthol sulfonic acids into the corresponding sulfonic acid chlorides and sulfinic acids, then to methylate the latter and finally to hydrolyze the O-acyl groups. Especially suitable coupling components of this kind are 1-hydroxynaphthalene-3- or -4- or -5-methyl sulfone, 2-hydroxy-napthalene-4- or -6- or -7-methyl sulfone, 1-phenyl-3-methyl-5-pyrazolone-3'-methyl sulfone, 1-phenyl-3-methyl-5-pyrazolone-4'-methyl sulfone and 1-acetoacetylaminobenzene-3- or -4-methyl sulfone.

The coupling of the diazo compounds to be used with the coupling-components can be carried out by the usual known methods, advantageously in an alkaline medium, for example, a medium rendered alkaline with an alkali carbonate or an alkali hydroxide. After the coupling reaction the dyestuffs can easily be separated from the coupling mixture by filtration for the purpose of metallization, since they are only slightly soluble in water. They are advantageously used in the form of filter cakes without intermediate drying. In some cases it is also possible to carry out the treatment with the agent yielding cobalt directly in the coupling mixture, that is to say, without any intermediate separation.

The treatment with an agent yielding cobalt is carried out in the present process in such manner that a cobaltiferous dyestuff is obtained which contains less than one atom of cobalt in complex union per molecule of monoazo-dyestuff. Accordingly the metallization is advantageously carried out with such agents yielding cobalt and by such methods as lead to complex cobalt compounds having this constitution. In general, it is desirable to use less than one atomic proportion of cobalt for each molecular proportion of monoazo-dyestuff and/or to carry out the treatment with the agent yielding cobalt in a weakly acid to alkaline medium. Accordingly, there are especially suitable for the present process those cobalt compounds which are stable in alkaline media such, for example, as complex cobalt compounds of aliphatic dicarboxylic acids or hydroxy-carboxylic acids. As examples of aliphatic dicarboxylic acids and hydroxycarboxylic acids there may be mentioned, among others oxalic acid, lactic acid, glycollic acid, citric acid and especially tartaric acid. As agents yielding cobalt there can also be used with advantage in the present process simple cobalt salts such as cobalt sulfate or cobalt acetate, and also cobalt hydroxide.

The conversion of the dyestuffs into the complex cobalt compounds is advantageously carried out with the aid of heat, under atmospheric or superatmospheric pressure, and if desired in the presence of suitable additions, for example, in the presence of salts of organic acids, bases, or organic solvents or other agents assisting the formation of complexes.

In a special form of the process there is used as starting material a mixture of different metallizable monoazo-dyestuffs, each of which corresponds to the general definition given above. The treatment with the agent yielding cobalt is carried out in this case also in such manner that the resulting cobaltiferous dyestuffs contain less than one atom of cobalt in complex union per molecule of monoazo-dyestuff.

The new cobaltiferous dyestuffs of this invention are cobalt compounds, containing less than one atom of cobalt bound in complex union per molecule of dyestuff, and advantageously one atom of cobalt bound in complex union to substantially two molecules of monoazo-dyestuffs free from sulfonic and carboxylic acid groups and corresponding to the general formula

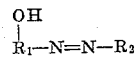

in which $R_1$ represents a benzene radical bound to the azo linkage in ortho-position relatively to the hydroxyl group, and $R_2$ represents the radical of a coupling component capable of coupling in a position vicinal to a hydroxyl group and which coupling component contains an aromatic radical, and in which one of the radicals $R_1$ and $R_2$ contains an aromatically bound methyl sulfone group.

These complex cobalt compounds are soluble in water and in weakly acid aqueous media and are indeed more soluble than the dyestuffs used for making them. They are suitable for dyeing or printing a very wide variety of materials, above all for dyeing animal materials, such as silk, leather and especially wool, but also for dyeing or printing synthetic fibers of superpolyamides or superpolyurethanes. They are suitable above all for dyeing from weakly alkaline or neutral to weakly acid, for example, acetic acid, baths. The wool dyeings so produced are distinguished by their level character and good properties of wet fastness, good fastness to decatizing and carbonizing and very good fastness to light.

The following examples illustrate the invention, the parts and percentages being by weight:

Example 1

18.7 parts of 2-amino-1-hydroxybenzene-4-methyl-sulfone are dissolved in 100 parts of water and 23.4 parts of hydrochloric acid of 30 per cent. strength, and diazotized at 0–5° C. by means of an aqueous solution of 6.9 parts of sodium nitrite. The diazo suspension is neutralized with sodium carbonate, and poured at 10–12° C. into a solution of 18 parts of 1-phenyl-3-methyl-5-pyrazolone in 200 parts of water and 13.3 parts of sodium hydroxide solution of 30 per cent. strength. Coupling proceeds very rapidly. The dyestuff formed precipitates almost completely. It is filtered off, stirred with 300 parts of water, and dissolved by the addition of 26.6 parts of sodium hydroxide solution of 30 per cent. strength. The solution is mixed at 80–85° C. with a solution of 16 parts of crystalline cobalt sulfate ($CoSO_4.7H_2O$) in 100 parts of water, stirred for 30 minutes at that temperature, and the whole is then filtered. The filtrate is evaporated in vacuo. The cobaltiferous dyestuff so obtained is a water-soluble brown powder, which dissolves in concentrated sulfuric acid with an orange-yellow coloration and dyes wool from a neutral or acetic acid bath yellow-brown tints having good properties of fastness.

In the following table are given a few further complex metal compounds which can be made by the process of this example. In all cases cobalt is the metal forming the complex. In column I are given the diazo-components and in column II the coupling components, and in column III are given the tints of the dyeings obtainable by dyeing 100 parts of wool with 2 parts of the cobalt compound from a neutral or acetic acid bath.

| | I | II | III |
|---|---|---|---|
| 1 | 2-Amino-1-hydroxy-benzene-4-methyl sulfone. | 2-hydroxynaphthalene. | reddish bordeaux. |
| 2 | ......do...................... | 6-bromo-2-hydroxy-naphthalene. | bordeaux. |
| 3 | ......do...................... | 5:8-dichloro-1-hydroxy-naphthalene. | bluish bordeaux. |
| 4 | ......do...................... | acetoacetylamino-benzene. | yellow. |
| 5 | ......do...................... | 1-(4'-chlorophenyl)-3-methyl-5-pyrazolone. | brown yellow. |
| 6 | ......do...................... | 1-acetoacetylamino-2-chlorobenzene. | yellow. |
| 7 | ......do...................... | 1-acetylamino-7-hydroxynaphthalene. | greyish violet. |
| 8 | ......do...................... | 1-phenyl-3-methyl-5-pyrazolone-4'-methylsulfone. | brown orange. |
| 9 | ......do...................... | 1-phenyl-3-methyl-5-pyrazolone-3'-sulfonic acid amide. | brownish yellow. |
| 10 | 2-amino-1-hydroxy-benzene-5-methyl sulfone. | 1-phenyl-3-methyl-5-pyrazolone. | orange. |
| 11 | ......do...................... | acetoacetylamino-benzene. | reddish yellow. |
| 12 | ......do...................... | β-naphthol. | bordeaux. |
| 13 | 2-amino-1-hydroxy-benzene-4-sulfonic acid methylamide. | 2-hydroxynaphthalene-7-methyl sulfone. | Do. |
| 14 | 2-amino-1-hydroxy-benzene-5-methyl-sulfone. | 5:8-dichloro-1-hydroxy-naphthalene. | violet. |
| 15 | ......do...................... | 1-(4'-chlorophenyl)-3-methyl-5-pyrazolone. | orange. |
| 16 | 4-nitro-2-amino-1-hydroxybenzene. | 1-phenyl-3-methyl-5-pyrazolone-4'-methylsulfone. | brownish yellow. |
| 17 | 5-nitro-2-amino-1-hydroxybenzene. | ......do...................... | reddish brown. |
| 18 | 4-chloro-2-amino-1-hydroxybenzene. | ......do...................... | brownish yellow. |
| 19 | 2-amino-1-hydroxybenzene-4-sulfonic acid amide. | 1-acetoacetyl-amino-benzene-4-methyl sulfone. | yellow. |
| 20 | 2-amino-1-hydroxy-benzene-4-sulfonic acid anilide. | ......do...................... | brownish yellow. |
| 21 | 3-amino-4-hydroxy-acetophenone. | ......do...................... | Do. |
| 22 | 4-nitro-2-amino-1-hydroxybenzene. | ......do...................... | Do. |

The 2-amino-1-hydroxybenzene-5-methyl sulfone mentioned as a diazo component in the above table can be prepared as follows:

1:2-benzoxazolone-5-sulfonic acid chloride is reduced with sodium sulfite to the benzoxazolone sulfinic acid, the latter is methylated, for example, by means of dimethyl sulfate, and the 1:2-benzoxazolone-5-methyl sulfone so obtained is converted by alkaline hydrolysis into 2-amino-1-hydroxybenzene-5-methylsulfone.

Example 2

19.95 parts of the dyestuff obtained from diazotized 2-amino-1-hydroxybenzene-4-methyl sulfone and 1-acetylamino-7-hydroxynaphthalene, and 20.3 parts of the dyestuff obtained from diazotized 2-amino-1-hydroxybenzene-4-methyl sulfone and 1-(4'-chlorophenyl)-3-methyl-5-pyrazolone are dissolved together in 2000 parts of water with the addition of 8 parts of sodium hydroxide, and mixed at 80° C. with 100 parts of a cobalt sulfate solution having a cobalt content of 3.25 per cent. After stirring for about ½ hour at 80° C. the metallization is finished. The cobalt complex is precipitated by the addition of sodium chloride. When dry it is a brown powder which dissolves in water with a brown coloration and in concentrated sulfuric acid with an orange coloration, and dyes wool from a weakly alkaline bath or a neutral or acid bath full brown tints having an excellent fastness to washing, decatizing and carbonizing.

Dyestuffs having similar properties are obtained by using instead of the monoazo-dyestuffs mentioned in the preceding paragraph the dyestuffs given in the following table, and otherwise proceeding in an analogous manner. In columns A and B are given the two ortho:ortho'-dihydroxymonoazo-dyestuffs bound in complex union to cobalt, and in column C are given the tints obtained by dyeing wool from an acetic acid or neutral bath.

| | A | B | C |
|---|---|---|---|
| 1 | 2-Amino-1-hydroxy-benzene-4-methylsulfone → 2-hydroxynaphthalene. | 2-amino-1-hydroxy-benzene-4-methylsulfone → 5:8-dichloro-1-hydroxynaphthalene. | bordeaux. |
| 2 | 2-amino-1-hydroxy-benzene-4-methylsulfone → 1-acetoacetylamino-2-chlorobenzene. | ------do------ | reddish brown. |
| 3 | 4-nitro-2-amino-1-hydroxybenzene → 1-phenyl-3-methyl-5-pyrazolone-4'-methyl sulfone. | 2-amino-1-hydroxybenzene-4-methylsulfone → 1-acetoacetylamino-2-chlorobenzene. | brownish yellow. |

*Example 3*

0.5 part of the cobaltiferous dyestuff obtained as described in Example 1 is dissolved in 4000 parts of water, 10 parts of crystalline sodium sulfate are added, and 100 parts of well wetted wool are entered at 40–50° C. into the resulting dyebath. 3 parts of acetic acid of 40 per cent. strength are then added, the bath is raised to the boil in the course of ½ hour, and dyeing is carried on for ¾ hour at the boil. Finally the wool is rinsed with cold water and dried. There is obtained a level brown-yellow dyeing having good properties of fastness to washing and light.

Practically the same dyeing is obtained if no acetic acid is added to the dyebath.

What is claimed is:

1. A complex cobalt compound containing one atom of cobalt bound in complex union with substantially to monoazo dyestuffs free from sulfonic acid and carboxylic acid groups, which correspond to the formula

wherein $R_1$ represents a benzene radical bound to the azo-linkage in ortho-position relatively to the hydroxyl group, and $R_2$ represents a radical selected from the group consisting of a hydroxynaphthalene radical bound to the azo-linkage in a position vicinal to the hydroxy group, a 1-phenyl-5-pyrazolone radical bound to the azo-linkage in 4-position, and the radical of a β-ketocarboxylic acid arylide bound to the azo-linkage in α-position, and wherein at least one of the radicals $R_1$ and $R_2$ contains an aromatically bound methyl sulfone group.

2. A complex cobalt compound containing one atom of cobalt bound in complex union to substantially two molecules of a monoazo dyestuff free from sulfonic acid and carboxylic acid groups, which corresponds to the formula

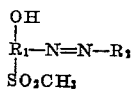

wherein $R_1$ represents a benzene radical bound to the azo-linkage in ortho-position relatively to the hydroxyl group, and $R_2$ represents a radical selected from the group consisting of a hydroxynaphthalene radical bound to the azo-linkage in a position vicinal to the hydroxy group, a 1-phenyl-5-pyrazolone radical bound to the azo-linkage in 4-position, and the radical of a β-ketocarboxylic acid arylide bound to the azo linkage in α-position.

3. A complex cobalt compound containing one atom of cobalt bound in complex union to substantially two molecules of a monoazo dyestuff free from sulfonic acid and carboxylic acid groups, which corresponds to the formula

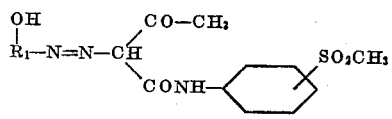

wherein $R_1$ represents a benzene radical bound to the azo linkage in ortho-position relatively to the hydroxyl group.

4. A complex cobalt compound containing one atom of cobalt bound in complex union to substantially two molecules of a monoazo dyestuff free from sulfonic acid and carboxylic acid groups, which corresponds to the formula

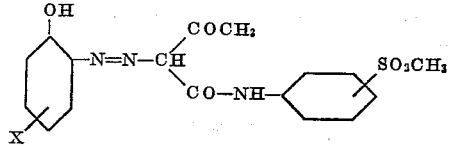

wherein X represents a member selected from the group consisting of a nitro group, a chlorine atom, a sulfonic acid amide group, and a —COCH₃— group.

5. A complex cobalt compound containing one atom of cobalt bound in complex union to substantially two molecules of a monoazo dyestuff free from sulfonic acid and carboxylic acid groups, which corresponds to the formula

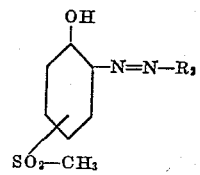

wherein $R_2$ represents a 2-hydroxynaphthalene radical bound to the azo-linkage in 1-position.

6. A complex cobalt compound containing one atom of cobalt bound in complex union to substantially two molecules of a monoazo dyestuff free from sulfonic acid and carboxylic acid groups, which corresponds to the formula

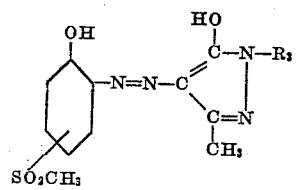

wherein $R_3$ represents a benzene radical.

7. A complex cobalt compound containing one atom of cobalt bound in complex union to substantially two molecules of a monoazo dyestuff free from sulfonic acid and carboxylic acid groups, which corresponds to the formula

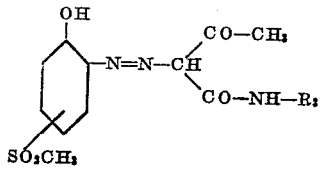

wherein $R_3$ represents a benzene radical.

8. A complex cobalt compound containing one atom of cobalt bound in complex union to substantially two molecules of a monoazo dyestuff corresponding to the formula

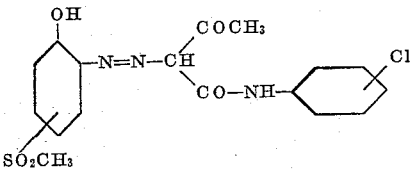

9. A complex cobalt compound containing one atom of cobalt bound in complex union to substantially two molecules of a monoazo dyestuff corresponding to the formula

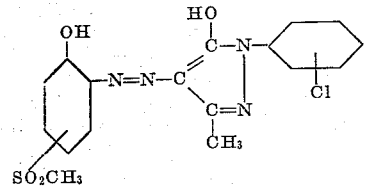

10. A complex cobalt compound containing one atom of cobalt bound in complex union to substantially two molecules of a monoazo dyestuff corresponding to the formula

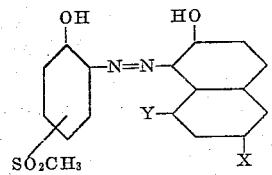

wherein X represents a member selected from the group consisting of a hydrogen and a bromine atom, and Y represents a member selected from the group consisting of an acetylamino group and a hydrogen atom, at least one of the two symbols X and Y standing for hydrogen.

11. A complex cobalt compound containing one atom of cobalt bound in complex union to substantially two molecules of a monoazo dyestuff corresponding to the formula

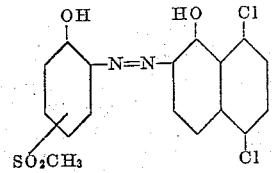

12. A complex cobalt compound containing one atom of cobalt bound in complex union to substantially two molecules of a monoazo dyestuff corresponding to the formula

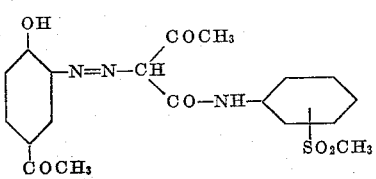

13. The complex cobalt compound containing one atom of cobalt bound in complex union to substantially two molecules of the monoazo dyestuff of the formula

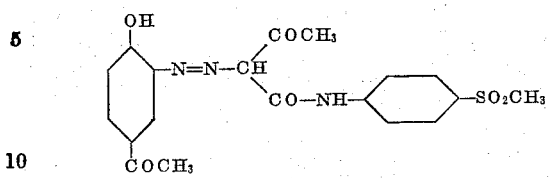

14. The complex cobalt compound containing one atom of cobalt bound in complex union to substantially two molecules of the monoazo dyestuff of the formula

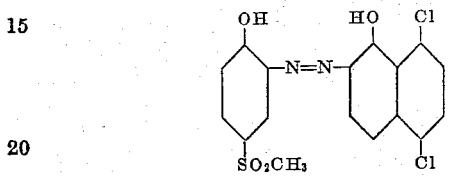

15. The complex cobalt compound containing one atom of cobalt bound in complex union to substantially two molecules of the monoazo dyestuff of the formula

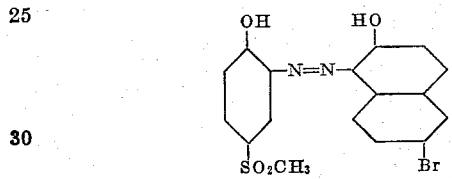

16. The complex cobalt compound containing one atom of cobalt bound in complex union to substantially two molecules of the monoazo dyestuff of the formula

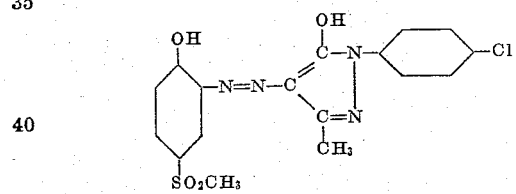

17. The complex cobalt compound containing one atom of cobalt bound in complex union to substantially two molecules of the monoazo dyestuff of the formula

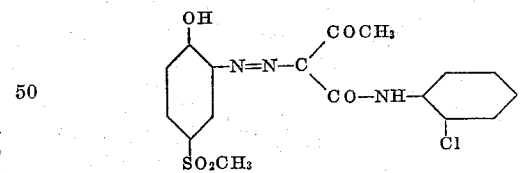

References Cited in the file of this patent

UNITED STATES PATENTS

| | | |
|---|---|---|
| 2,432,403 | Felix et al. | Dec. 9, 1947 |
| 2,551,056 | Schetty | May 1, 1951 |